US006052891A

United States Patent [19]

Kumpf

[11] Patent Number: 6,052,891

[45] Date of Patent: Apr. 25, 2000

[54] DEVICE FOR MAKING AN ELECTRICAL POWER CABLE

[75] Inventor: Friedhelm Kumpf, Pulheim, Germany

[73] Assignee: Frisch Kabel - und Verseilmaschinenbau GmbH, Ratingen, Germany

[21] Appl. No.: 09/154,562

[22] Filed: Sep. 16, 1998

Related U.S. Application Data

[62] Division of application No. 08/541,111, Oct. 11, 1995.

[30] Foreign Application Priority Data

Mar. 27, 1995 [DE] Germany ........................... 195 10 485

[51] Int. Cl.[7] ........................................ B23P 19/00

[52] U.S. Cl. ................................ 29/745; 29/825; 57/293; 57/294

[58] Field of Search ............................ 29/825, 828, 745; 81/9.51; 156/48, 51; 57/293, 294

[56] References Cited

U.S. PATENT DOCUMENTS

| | | |
|---|---|---|
| 3,872,660 | 3/1975 | Gallagher-Daggitt . |
| 4,209,966 | 7/1980 | Sutor et al. . |
| 4,393,582 | 7/1983 | Arnold, Jr. et al. . |
| 4,436,954 | 3/1984 | Kaderjak et al. . |
| 4,645,628 | 2/1987 | Gill . |
| 5,133,121 | 7/1992 | Birbeck et al. . |
| 5,237,809 | 8/1993 | Oestreich et al. . |
| 5,243,137 | 9/1993 | Gentry . |
| 5,374,783 | 12/1994 | Gentry . |
| 5,513,487 | 5/1996 | Kumpf et al. . |
| 5,551,224 | 9/1996 | Kumpf et al. . |

FOREIGN PATENT DOCUMENTS

| | | |
|---|---|---|
| 1305559 | 2/1973 | United Kingdom . |

OTHER PUBLICATIONS

"Combined stranding process in telephone cable manufacture" by: Dieter Vogelsberg and Joachim Meyer (Wire Journal International) pp. 36–42.

*Primary Examiner*—Carl J. Arbes
*Attorney, Agent, or Firm*—Ware, Fressola, Van der Sluys & Adolphson LLP

[57] ABSTRACT

An electrical power cable includes plastic-insulated conductors and a single wire, which is enveloped by a lengthwise incoming insulating tape and is twisted together with the conductors, all of which are surrounded by a common sheath. The conductors and the single wire are twisted together with alternating stroke directions (SZ), and the tape is loosely placed around the single wire in the form of a strand with opposing edges of the tape having alternating directions of rotation along the length of the strand.

6 Claims, 4 Drawing Sheets

DEVICE FOR MAKING AN ELECTRICAL POWER CABLE

This application is a divisional of copending application, Ser. No. 08/541,111, filed on Oct. 11, 1995.

TECHNICAL FIELD

The present invention relates to an electrical energy cable.

DESCRIPTION OF THE PRIOR ART

Electric power cables of the type having plastic insulated conductors, and a single wire which is twisted with the plastic insulated conductors and is enveloped by a lengthwise running insulating tape, where all are enclosed in a common sheath can be obtained in the market. For example, such a cable may be of the kind where a copper wire covered by a paper tape is a so-called ground wire which is included with the insulated conductors. During the manufacture of such a cable, ground wire and conductors are drawn from respective storage supplies and are then guided to a twisting installation. Aside from the fact that this manufacturing technique requires a separate manufacturing step for covering the ground wire with the paper tape, there is the danger of damaging the paper cover when the paper-insulated wire is reeled and unreeled, so that the paper cover can rip or be torn off when the elements to be twisted are inserted into a twisting head. A cable produced in this manner no longer fulfills the conditions placed on such a cable with an added ground wire.

SUMMARY OF THE INVENTION

Objects of the invention include ensuring the required quality of a cable having plastic insulated conductors and a ground wire enveloped by an insulating tape, the conductors and tape enveloped ground wire being enclosed in a common outer sheath, but at the same time to ensure that the manufacturing process takes place without problems, in addition to increasing the manufacturing speed. A device for performing the manufacture of such a cable must have a simple construction and guarantee high operating safety at elevated discharge speeds.

This task is fulfilled by providing conductors and a wire in a storage path and guiding the conductors and wire to a twisting point after passing through the storage path. The conductors and wire are twisted in alternating directions and/or rpm, and an insulating tape for enveloping the wire is guided in a lengthwise stretched condition along the storage path and is formed into a sheath around the wire at or before the twisting point.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
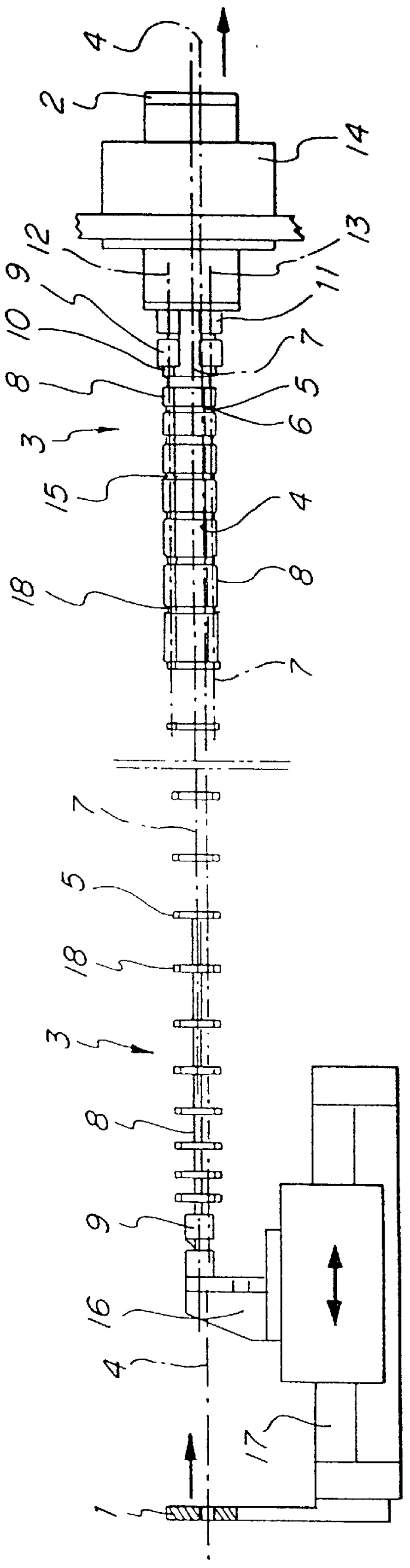
FIG. 1 is a side view of a stranding device for manufacturing the electrical energy cable of the present invention rotated by 90° for better viewing.

As illustrated in FIG. 1, the storage path 3 is located between the stationary guide disk 1 and the twisting disk 2 that rotates in alternating directions, in which the stranding elements 4 are twisted in one direction while the twisting disk 2 rotates, and from which they are discharged after the change in the direction of rotation. Holding elements 5 with guide holes 6 are spaced along the storage path 3 to guide the stranding elements 4, which are drawn from stationary storage supplies not shown in the drawing, only one of which is illustrated for reasons of clarity. In the illustrated configuration example, the holding elements 5 are disks with a central guide hole 6 for example, with a core inlet and other guide holes distributed around the periphery for twisting the stranding elements.

The holding elements 5 are located on tensile strength support elements 7, which in turn are held in place by separate spacer rings 18. The support elements 7 are made of highly flexible plastic coated steel cables for example, and the plastic tubes 8 serve to space and secure the holding elements 5 on these support elements. As can easily be seen in FIG. 1, these tubes 8 have different lengths, so that the spaces between individual holding elements 5 can be of different lengths. It was proven advantageous to increase the distance between each two holding elements 5 with respect to the center of the storage path 3, starting from the stationary guide disk 1, as well as from the rotating twisting disk 2. For example, an advantageous configuration of the invention starts with a first space of about 10 mm from the holder 9, then increases the distance in steps of 5 mm up to 55 mm at the storage center, and then decreases the distance in the direction of the rotating twisting disk in steps of 5 mm down to the original 10 mm.

According to the invention, both ends of the support elements 7 can swivel and/or rotate. This is accomplished with holders 9, into which the support elements 7 are inserted and clamped tight. The last tube 10 is made of a coiled steel wire covered with an external plastic layer, as protection against buckling; this tube 10 is flexible in itself and can easily follow the movements of the support elements 7. The danger of buckling in this area or damage from external influences, perhaps during clamping due to an installation error, are avoided. As illustrated, the holder 9 itself can swivel vertically and horizontally from the depicted position by means of universal joint 11, and can rotate by means of axial bearings 12 and radial bearings 13, so that torsional stresses occurring from the rotation of the two support elements 7 during the twisting process are equalized, and need not be absorbed by the support elements 7 themselves.

The driven, rotating twisting disk 2 is located in the housing 14; after the stranding elements 4 have passed through in the direction of the arrow, they are joined into the twisted strand at the adjacent, not illustrated twisting point.

The perforated stationary disk 1 is located at the other end of the storage path 3. The holder 16 is able to move back and forth in order to adapt the support elements 7 in regard to their prestress to the momentary operating condition of the storage path 3 during the twisting process. A pneumatic system 17 with so-called linear compressed air cylinders is used to that effect, which makes it possible to separately prestress each individual support element. Another advantage of this clamping system is the linear guidance with a relatively small mass, which is integrated into the compressed air cylinders, in this way reducing the inertia of the parts to be moved even further.

Figure 2:
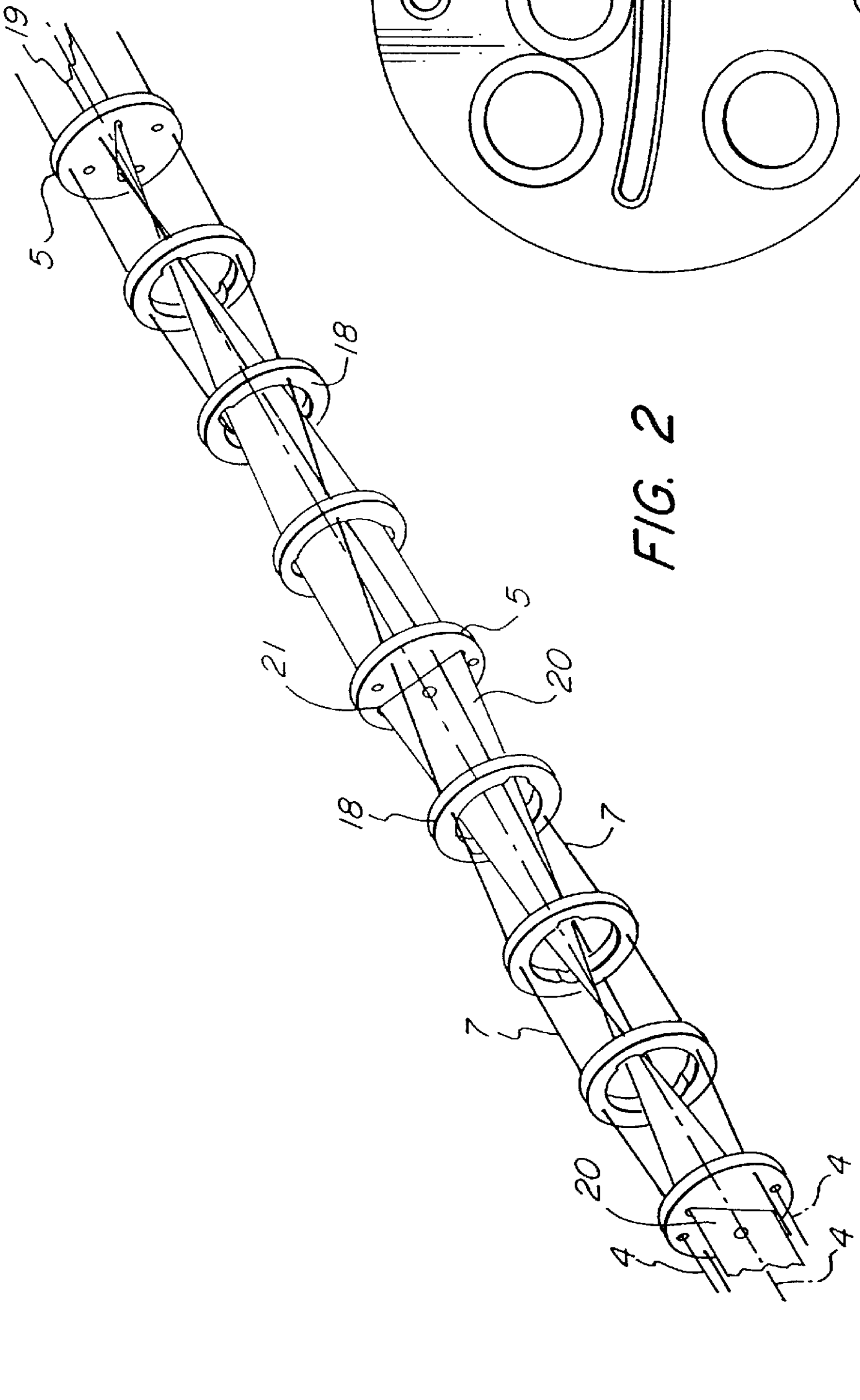
FIG. 2 is an enlarged perspective view of a storage path of the device of FIG. 1.

FIG. 2 illustrates the storage path of the twisting installation according to the invention in an enlarged measure with respect to FIG. 1. The individual elements have the already selected reference numbers of FIG. 1.

The still bare ground wire 19, made for example of copper or aluminum, passes through the storage path in the same manner as the insulated conductors 4, as well as the tape 20, made for example of paper. The tape 20 is guided in a stretched condition, for which purpose guide slots 21 are provided in the holding elements, and are preferably located in the center to prevent the tape from rotating during passage through the storage path. In this way the tape is kept free of torsion, the active tensile forces are without effect because of the negligible friction during the passage through the holding elements.

As can be seen in the drawing, in this case the ground wire 19 is guided lengthwise along tape 20, this guidance facilitates wrapping the tape 20 around the wire 19 at the end of the storage path. To that effect, the last holding elements 5 in the passage direction could have holes with diameters that decrease towards the twisting head 16, to ensure the tube-like envelopment of the ground wire 19 by the tape 20.

Figure 3:
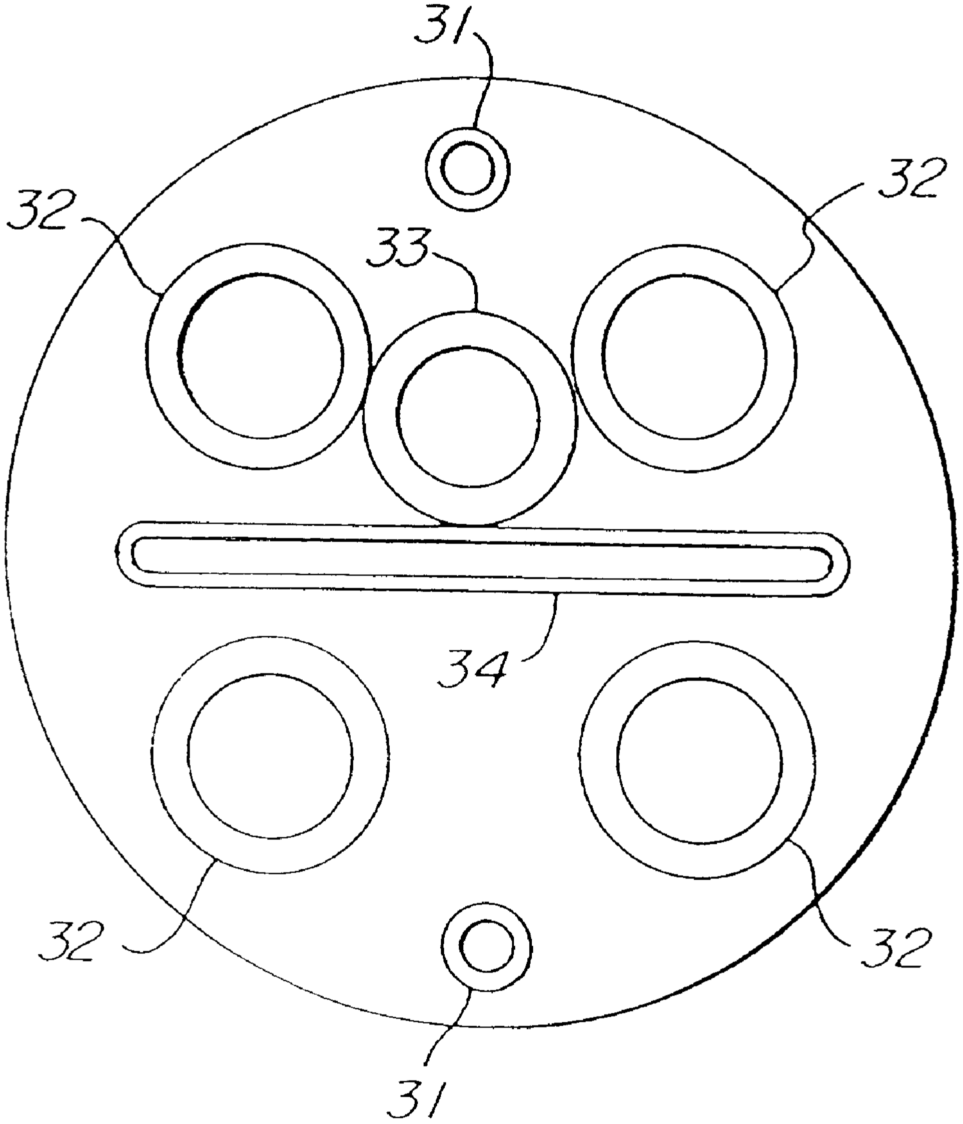
FIG. 3 is a plan view of a disk or holding element of the device of FIG. 1.

Referring to FIG. 3, the holding element (or disc) 5 is shown in greater detail. The holding element 5 includes through going apertures (boreholes) 31 for receiving support elements (carrying elements) 7 (FIG. 2). Additionally, guide holes 32 are formed in the holding element 5 for receiving the stranding elements (conductors) 4 (FIG. 2). An additional guide hole or through going aperture 33 is provided for receiving an additional stranding element 19 (FIG. 2), e.g., a ground conductor 19 as described hereinabove with respect to FIG. 2. The paper tape or insulating tape 20 (FIG. 2) is received through a slit (lengthwise aperture or guide hole) 34 formed in the holding element 7.

Figure 4:
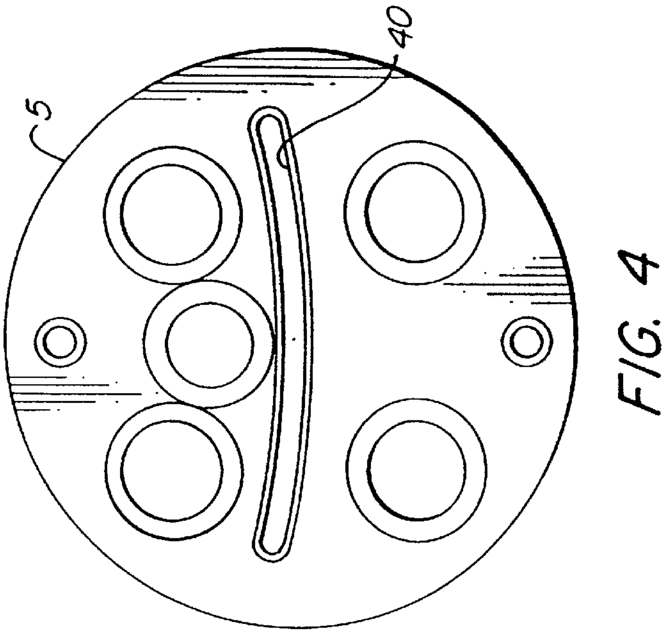
FIG. 4 is a plan view of the holding element of FIG. 3 having a U-shaped guide hole (guide slot)

As described above, the last holding elements 5 in the storage path may be provided with guide holes (guide slots) 34 with decreasing diameter approaching the twisting head. Additionally, as shown in FIG. 4, the holding elements 5 may be provided with U-shaped guide holes (guide slots) 40 approaching the twisting head to ensure the tube-like envelopment of the ground wire 19 (FIG. 2) by the tape 20 (FIG. 2.). In one embodiment of the invention, the bending radius of the U-shaped guide slots 40 decreases for guide slots in guide disks positioned towards the discharge end of the storage path adjacent to the twisting head.

Figure 5:
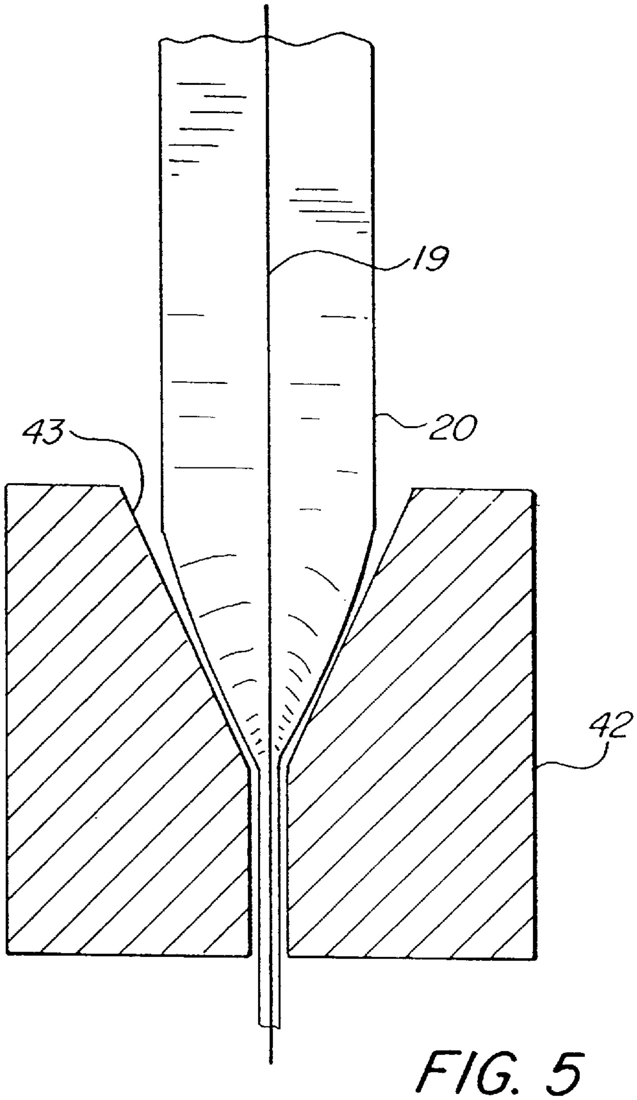
FIG. 5 is a cross-sectional view of a guide cone positioned at the end of a storage path in the stranding device of FIG. 1.

In another embodiment of the invention, as shown in FIG. 5, a guide cone 42 having an internal diameter 43 that decreases toward the end of the storage path may be provided to ensure the tube-like envelopment of the ground wire 19 by the tape 20. The guide cone 42 is positioned adjacent to the twisting head at the end of the storage path.

Figure 6:
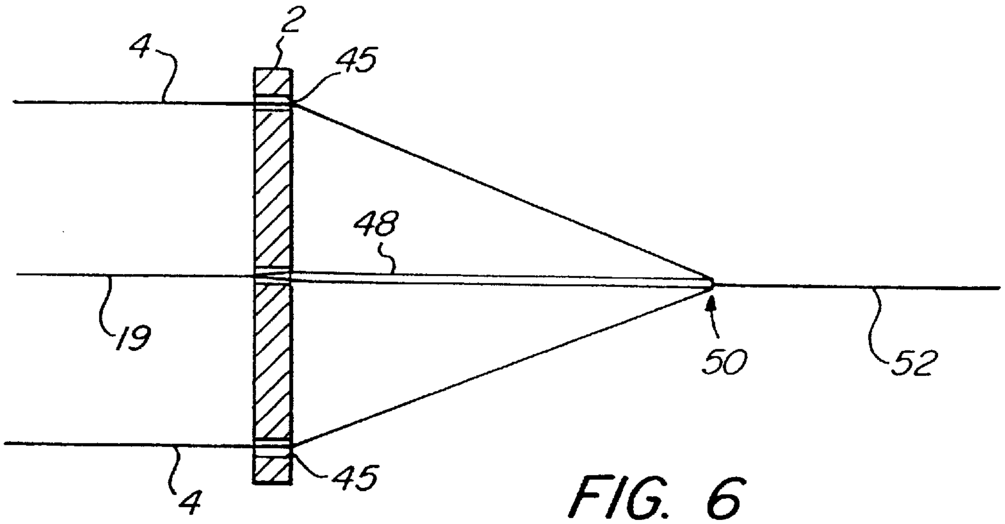
FIG. 6 is a cross-sectional view of a twisting disc and guide tube of the stranding device of FIG. 1.

Referring now to FIG. 6, the twisting disk 2 is provided with throughgoing apertures 45 for guiding the stranding elements (conductors) 4 and the additional stranding element 19 (FIG. 2), e.g., the ground wire enveloped by the tape 20. The twisting disk is driven to rotate in alternating directions and at alternating speeds. A guide tube 48 may be positioned between the twisting disk 2 and a twisting point 50, with the tape enveloped wire passing through the guide tube 48 to the twisting point 50. The twisted cable 52 exits the twisting point 50.

Although the invention has been described and illustrated with respect to exemplary embodiments thereof, the foregoing and various other additions and omissions may be made therein and thereto without departing from the spirit and scope of the present invention.

I claim:

1. A device for manufacturing an electrical power cable of plastic insulated conductors and at least one wire enveloped by a lengthwise running insulating tape, said conductors and said tape enveloped wire being twisted together and surrounded by a common outer sheath, said device comprising:

means for guiding said conductors, said wire and said tape through a storage path to a twisting point;

means located at said twisting point for twisting said conductors, said wire and said tape at said twisting point as said conductors, said wire and said tape are guided by said guiding means; and intermediate storage means located in said storage path, said intermediate storage means including spaced guide disks having throughgoing apertures for said conductors and said wire to be twisted, said guide disks further containing an additional guide slot corresponding to said tape.

2. A device as claimed in claim 1, wherein said guide slot in each one of said guide disks is located in the center of said guide disk near one of said throughgoing apertures corresponding to said wire.

3. A device as claimed in claim 1, wherein one or more of said guide disks located at a discharge end of said intermediate storage means adjacent to said twisting means contain U-shaped guide slots for said tape, said U-shaped guide slots having a bending radius that decreases for said guide slots in said guide disks positioned toward said discharge end of said intermediate storage means.

4. A device as claimed in claim 1, wherein said guide disks located at a discharge end of said intermediate storage means adjacent to said twisting means contain guide slots having a diameter that decreases in the guide disks toward said discharge end of said intermediate storage means.

5. A device as claimed in claim 1, further comprising a guide cone adjacent to said twisting means at an end of said storage path, said guide cone having an internal diameter that decreases toward an end of said storage path adjacent to said twisting means, said guide cone being provided to receive said tape at a discharge end of said intermediate storage means.

6. A device as claimed in claim 1, wherein said twisting means comprises:

a twisting head;

a twisting disk with throughgoing apertures for guiding said conductors and said wire enveloped by said tape, said twisting disk being driven to rotate in alternating directions and at alternating speeds; and a guide tube provided for said tape enveloped wire, said guide tube being positioned between an outlet of said twisting disk and a twisting point.

* * * * *